United States Patent [19]
Fetterman et al.

[11] Patent Number: 5,627,985
[45] Date of Patent: May 6, 1997

[54] SPECULATIVE AND COMMITTED RESOURCE FILES IN AN OUT-OF-ORDER PROCESSOR

[75] Inventors: Michael A. Fetterman; Andrew F. Glew, both of Hillsboro; David B. Papworth, Beaverton; Glenn J. Hinton; Robert P. Colwell, both of Portland, all of Oreg.

[73] Assignee: Intel Corporation, Santa Clara, Calif.

[21] Appl. No.: 177,244

[22] Filed: Jan. 4, 1994

[51] Int. Cl.[6] ................................................ G06F 9/34
[52] U.S. Cl. ............... 395/393; 364/232.22; 364/931.02
[58] Field of Search ................................ 395/393, 800, 395/775

[56] References Cited

U.S. PATENT DOCUMENTS

| | | | |
|---|---|---|---|
| 4,885,684 | 12/1989 | Austin | 395/650 |
| 4,903,196 | 2/1990 | Pomerene | 395/375 |
| 4,926,322 | 5/1990 | Stimac | 395/500 |
| 4,942,525 | 7/1990 | Shintani | 395/375 |
| 4,991,090 | 2/1991 | Emma | 395/575 |
| 5,303,356 | 4/1994 | Vassiliadis | 395/375 |
| 5,313,551 | 5/1994 | Labrousse | 395/425 |

OTHER PUBLICATIONS

V. Popescu, et al., "The Metaflow Architecture", IEEE Micro, 1991, pp. 10–13, and 63–73.

Mike Johnson, "Superscalar Microprocessor Design", Prentice Hall, 1991.

*Primary Examiner*—David Y. Eng
*Attorney, Agent, or Firm*—Blakely, Sokoloff, Taylor & Zafman

[57] ABSTRACT

A speculative execution out of order processor comprising a reorder circuit containing a plurality of physical registers that buffer speculative execution results for integer and floating-point operations, and a real register circuit containing a plurality of committed state registers that buffer committed execution results for either integer or floating-point operations, depending on the register. The reorder and real register circuits read the speculative and committed source data values for incoming micro-ops, and transfer the speculative and committed source data values over to a micro-op dispatch circuit over a common data path. A retire logic circuit commits the speculative execution results to an architectural state by transferring the speculative execution results from the reorder circuit to the real register circuit.

33 Claims, 12 Drawing Sheets

| ENTRY VALID | OPCODE | SRC1/SRC2 | V | PSRC1/ PSRC2 | PDST |
|---|---|---|---|---|---|
| RS0 | | | | | |
| RSX | sub | 751 | 1 | 36 | 57 |
| | | 522 | 1 | 35 | |

Reservation Station Table 84

| | RESULT DATA | V | LDST |
|---|---|---|---|
| RE19 | 229 | 1 | EAX |
| RE35 | (522) | 1 | EBX |
| RE36 | (751) | 1 | EAX |
| RE57 | yyy | 0 | ECX |

Reorder Buffer 82

| | RESULT DATA |
|---|---|
| EAX | (229→751) |
| EBX | (312→522) |
| ECX | |

Real Register File 86

| | ROB POINTER | RRFV |
|---|---|---|
| EAX | 36 | 0→1 |
| EBX | 35 | 0→1 |
| ECX | 57 | 0 |

Register Alias Table 80

*Fig. 11*

SPECULATIVE AND COMMITTED RESOURCE FILES IN AN OUT-OF-ORDER PROCESSOR

BACKGROUND OF THE INVENTION

1. Field of the Invention

The present invention pertains to the field of computer systems. More particularly, this invention relates to an architecture for the speculative resource files and committed resource files in a processor employing speculative and out of order instruction execution.

2. Background

Typical prior computer processors implement in-order instruction execution pipelines. An in-order processor usually fetches an instruction stream from an external memory, and executes the instructions in a sequential program order. Such in-order processing of the instruction stream ensures that the data dependencies of the instructions are strictly observed during execution.

For example, instructions in the instruction stream commonly use the results of previous instructions as source data. The in-order execution of the instruction stream ensures that the previous instructions execute and provide the proper source data before execution of the subsequent instructions that require the source data.

A processor may implement an out of order instruction execution pipeline to increase instruction execution performance. Such a processor executes ready instructions in the instruction stream ahead of earlier instructions that are not ready. A ready instruction is typically an instruction having fully assembled source data.

Such out of order execution improves processor performance because the instruction execution pipeline of the processor does not stall while assembling source data for a non ready instruction. For example, a non ready instruction awaiting source data from an external memory fetch does not stall the execution of later instructions in the instruction stream that are ready to execute.

Some out of order processors may fetch a macroinstruction stream from an external memory, and convert each macroinstruction of the incoming stream into a set of micro instructions in a sequential program order. Such an out of order processor then executes the micro instructions according to the availability of source data and execution resources rather than the program order.

A processor may also implement a speculative instruction execution pipeline to increase instruction execution performance. A processor having speculative instruction execution typically determines a speculative execution path through a program by predicting the outcome of conditional branch instructions. Such a processor fetches an instruction stream from an external memory, predicts whether conditional branch instructions in the instruction stream will result in a branch, and continues fetching and executing the instruction stream according to the prediction. Such speculative execution increases processor performance because the instruction execution pipeline does not stall during the resolution of conditional branch instructions.

A processor that implements an out of order instruction execution pipeline along with speculative instruction execution generates out of order speculative result data for each micro instruction. The result data is out of order because the micro-instructions that cause generation of the result data are executed out of order. The result data is speculative until the branch prediction that caused speculative execution of the corresponding micro instruction is resolved. The branch prediction is resolved by comparing the prediction with a result of the conditional branch instruction. The result data for a micro instruction is also speculative until program exceptions for the corresponding macroinstruction are resolved. Program exceptions may include, for example, memory address space violations.

Such a speculative out of order processor may implement a reorder register file to buffer the speculative result data until the branch condition and program exceptions are resolved. The speculative result data in the reorder register file is discarded if a branch was mispredicted or if a program exception occurs. The speculative result data in the reorder register file is committed to the architectural state according to the Intel Microprocessor Architecture if the branch was correctly predicted and if a program exception does not occur. The reorder register file may also reimpose the original program order on the result data.

The architecture of such a reorder register file in a speculative out of order processor embodies a balance between the complexity of managing the speculative and committed status of the result data and the integrated circuit chip area required to implement the reorder register file.

For example, if the reorder register file buffers both speculative and committed result data, then the task of managing the speculative and committed status of each register in the reorder register file is relatively complex. On the other hand, such a reorder register file that buffers both speculative and committed result data minimizes the processor chip area because each register in the reorder register file performs dual functions.

Also, a typical prior processor implements separate integer and floating-point register files because floating-point data values usually require wider registers and data paths in comparison to integer data values. A prior speculative out-of-order processor would require implementation of an integer reorder register file for the speculative and committed integer result data and a floating-point reorder register file for the speculative and committed floating-point result data. Such separate integer and floating-point reorder register files increases the processor chip area. Such an increase in processor chip area increases the manufacturing cost of the processor.

SUMMARY AND OBJECTS OF THE INVENTION

One object of the present invention is to minimize the chip area required to implement a speculative execution out of order processor by providing a common source data read path for speculative source data from a speculative register file and committed source data from a committed state register file.

Another object of the present invention is to minimize the chip area required to implement a speculative execution out of order processor by providing a speculative register file that buffers both floating-point data values and integer data values.

A further object of the present invention is to provide a mechanism for committing the speculative results of out of order execution to the architectural state while minimizing the complexity of managing the speculative and committed status of the speculative and committed state register files.

These and other objects of the invention are provided by a speculative execution out of order processor comprising a register alias circuit that receives at least one logical micro-op comprising an opcode, at least one logical source, and a logical destination from an in-order instruction fetch and micro-op dispatch circuit. The logical sources and destinations each specify one of a plurality of architectural registers for the logical micro-ops. The register alias circuit generates a physical micro-op for each logical micro-op by renaming each logical source into a physical source and by renaming the logical destination into a physical destination.

The speculative execution out of order processor further comprises a reorder circuit containing a plurality of physical registers that buffer speculative execution results. The physical registers buffer integer data values and floating-point data values. The reorder circuit receives the physical sources of micro-ops from the register alias circuit, and reads a speculative source data value from the physical registers for each physical source that specifies the physical registers. The reorder circuit transfers the speculative source data values over a source data bus to a reservation and dispatch circuit.

The speculative execution out of order processor further comprises a real register circuit containing a plurality of committed state registers that buffer committed execution results. The real register circuit receives the physical sources of micro-ops from the register alias circuit, and reads a committed source data value from the committed state registers for each physical source that specifies the committed state registers. The real register circuit transfers the committed source data values over the source data bus to the reservation and dispatch circuit.

The speculative execution out of order processor further comprises a retirement logic circuit that commits the speculative execution results to the architectural state by reading the speculative execution results from the physical registers of the reorder circuit and writing the speculative execution results into the committed state registers in the real register circuit.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which:

FIG. 11 illustrates the retirement of speculative information from physical registers in the reorder buffer to committed state registers in the real register file over the retirement bus;

DETAILED DESCRIPTION

Figure 1:
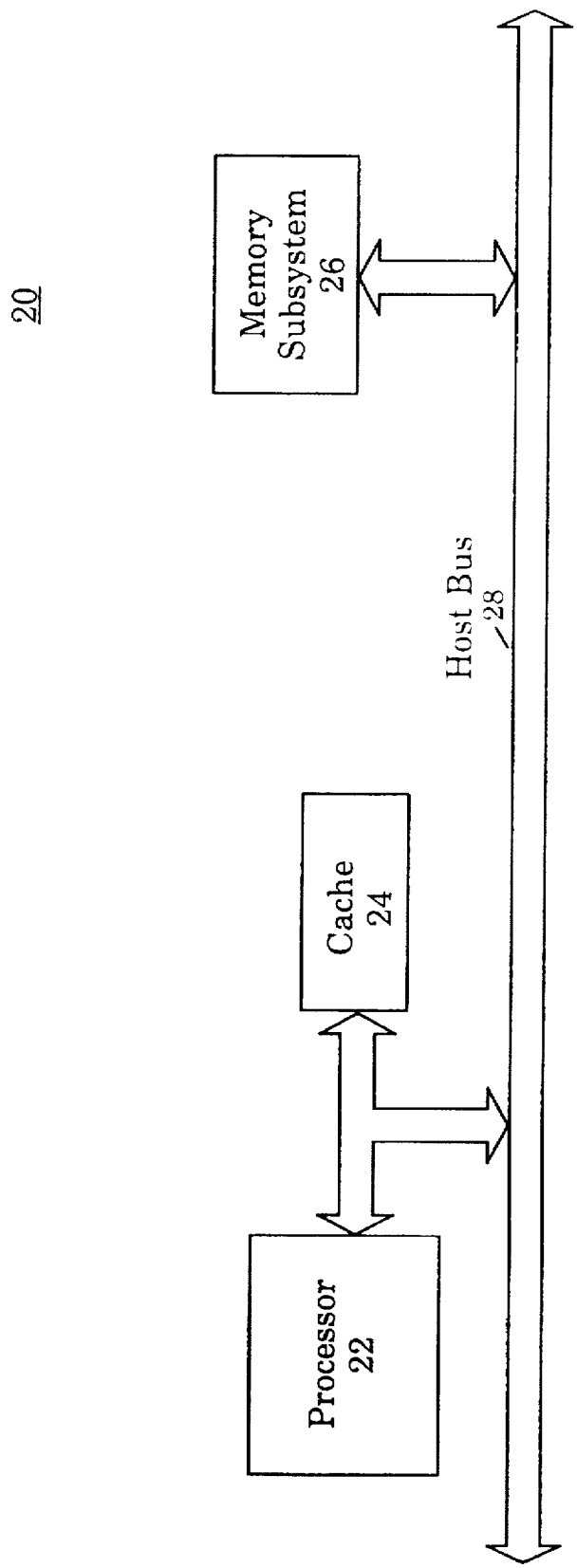
FIG. 1 illustrates a computer system comprising a processor, a cache circuit, and a memory subsystem.

FIG. 1 illustrates a computer system 20. The computer system 20 comprises a processor 22, a cache circuit 24, and a memory subsystem 26. The processor 22, the cache circuit 24 and the memory subsystem 26 communicate over a host bus 28.

The processor 22 fetches a stream of macroinstructions from the memory subsystem 26 over the host bus 28 through the cache circuit 24. The processor 22 executes the stream of macroinstructions and maintains data storage through the cache circuit 24 in the memory subsystem 26.

The cache circuit 24 is an instruction cache for macroinstructions executed by the processor 22. The cache circuit 24 is also a data cache for the processor 22.

Figure 2:
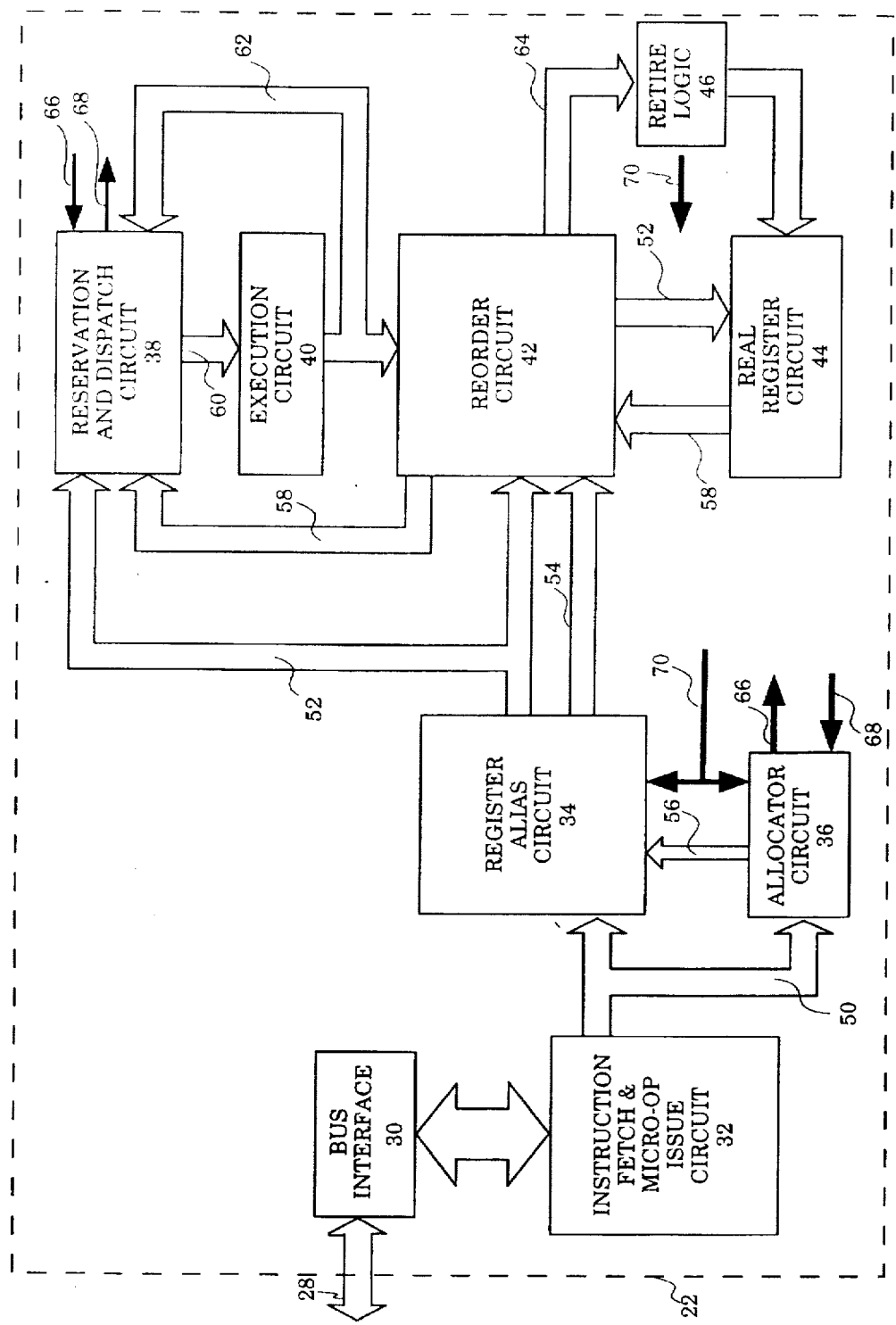
FIG. 2 is a block diagram of the processor comprising a front-end section, a register renaming section, and an out of order execution section.

FIG. 2 is a block diagram of the processor 22. The processor 22 comprises a front-end section including a bus interface circuit 30 and an instruction fetch and micro-op issue circuit 32. The processor 22 also comprises a register renaming section including a register alias circuit 34 and an allocator circuit 36. The processor 22 also comprises an out of order execution section comprising a reservation and dispatch circuit 38, an execution circuit 40, a reorder circuit 42, and a real register circuit 44.

The bus interface circuit 30 enables transfer of address, data and control information over the host bus 28. The instruction fetch and micro-op issue circuit 32 fetches a stream of macroinstructions from the memory subsystem 26 over the host bus 28 through the bus interface circuit 30. The instruction fetch and micro-op issue circuit 32 implements speculative branch prediction while fetching the stream of macroinstructions.

For one embodiment the stream of macroinstructions fetched over the host bus 28 comprises a stream of Intel Architecture Microprocessor macroinstructions. The Intel Architecture Microprocessor macroinstructions operate on a set of architectural registers for the Intel Architecture Microprocessor, including an EAX register, an EBX register, an ECX register, and an EDX register, etc.

The instruction fetch and micro-op issue circuit 32 converts each macroinstruction of the incoming stream of macroinstructions into a set of one or more logical micro operations, hereinafter referred to as logical micro-ops. The instruction fetch and micro-op issue circuit 32 issues the logical micro-ops in order. The logical micro-ops corresponding to each macroinstruction are reduced instruction set micro operations that perform the function of the corresponding macroinstruction. The logical micro-ops specify arithmetic and logical operations as well as load and store operations to the memory subsystem 26.

The instruction fetch and micro-op issue circuit 32 transfers the in-order stream of logical micro-ops to the register alias circuit 34 and the allocator circuit 36 over a logical micro-op bus 50. For one embodiment, the instruction fetch and micro-op issue circuit 32 issues up to four in-order logical micro-ops during each clock cycle of the processor 22.

Each logical micro-op comprises an op code, a pair of logical sources and a logical destination. The logical sources and the logical destinations of the logical micro-ops specify architectural registers of the original macroinstructions. In addition, the logical sources and the logical destinations of the logical micro-ops specify temporary registers for microcode executing from the instruction fetch and micro-op issue circuit 32.

The register alias circuit 34 receives the in-order logical micro-ops, and generates a corresponding set of in-order physical micro-ops by renaming the logical sources and logical destinations of the logical micro-ops. The register alias circuit 34 receives the in-order logical micro-ops over the logical micro-op bus 50, maps the logical sources of each logical micro-op into physical sources and a physical destination, and transfers the in-order physical micro-ops over a physical micro-op bus 52.

Each physical micro-op comprises the opcode of the corresponding logical micro-op, a pair of physical sources, and a physical destination. The physical sources of the physical micro-ops specify physical registers contained in the reorder circuit 42 and committed state registers contained in the real register circuit 44. The physical destinations of the physical micro-ops specify physical registers contained in the reorder circuit 42.

The register alias circuit 34 transfers the logical destinations of the logical micro-ops over a logical destination bus 54. The logical destinations transferred over the logical destination bus 54 identify the architectural registers that correspond to the physical destinations on the physical micro-op bus 52.

The allocator circuit 36 tracks the available resources in the reorder circuit 42 and the reservation and dispatch circuit 38. The allocator circuit 36 assigns physical registers in the reorder circuit 42 to the destinations of the incoming logical micro-ops on the logical micro-op bus 50. The allocator circuit 36 also assigns reservation station entries in the reservation and dispatch circuit 38 to the physical micro-ops on the physical micro-op bus 52.

The allocator circuit 36 transfers allocated physical destinations to the register alias circuit 34 over a physical destination bus 56. The allocated physical destinations specify physical registers in the reorder circuit 42 for buffering speculative results for the physical micro-ops. The allocated physical destinations are used by the register alias circuit 34 to rename the logical destinations of the logical micro-ops to physical destinations.

The allocator circuit 36 allocates the physical registers of the reorder circuit 42 to the physical micro-ops in the same order that logical micro-ops are received over the logical micro-op bus 50. The allocator circuit 36 maintains an allocation pointer for allocating physical registers of the reorder circuit 42. The allocation pointer points to a next set of consecutive physical registers in the reorder circuit 42 for each set of logical micro-ops received over the logical micro-op bus 50. The ordering of the physical registers assigned to the physical micro-ops in the reorder circuit 42 reflects the ordering of the original logical micro-ops.

The allocator circuit 36 also assigns reservation station entries in the reservation and dispatch circuit 38 for the logical micro-ops received over the logical micro-op bus 50. The allocator circuit 36 specifies the new reservation station entries by transferring reservation station entry select signal to the reservation and dispatch circuit 38 over a reservation station select bus 66.

The reservation and dispatch circuit 38 assembles the physical micro-ops awaiting execution by the execution circuit 40. The reservation and dispatch circuit 38 receives the in-order physical micro-ops over the physical micro-op bus 52, assembles the source data for the physical micro-ops, and dispatches the physical micro-ops to the execution circuit 40.

The reservation and dispatch circuit 38 receives the physical micro-ops over the physical micro-op bus 52 and stores the physical micro-ops in available reservation station entries. The reservation and dispatch circuit 38 waits for the source data required by the physical micro-ops, and dispatches the physical micro-ops to appropriate execution units in the execution circuit 40 when the source data is assembled.

The reservation and dispatch circuit 38 receives the source data for the pending physical micro-ops from the reorder circuit 42 and the real register circuit 44 over a source data bus 58. The reservation and dispatch circuit 38 also receives source data for the pending physical micro-ops from the execution circuit 40 over a result bus 62 during a write back of speculative results from the execution circuit 40 to the reorder circuit 42.

The reservation and dispatch circuit 38 schedules the physical micro-ops having completely assembled source data for execution. The reservation and dispatch circuit 38 dispatches the ready physical micro-ops to the execution circuit 40 over a micro-op dispatch bus 60. The reservation and dispatch circuit 38 schedules execution of physical micro-ops out of order according to the availability of the source data for the physical micro-ops, and according to the availability of execution unit resources in the execution circuit 40.

The execution circuit 40 writes back the speculative results from the out of order execution of the physical micro-ops to the reorder circuit 42 over the result bus 62. The writes back of speculative results by the execution circuit 40 is out of order due to the out of order dispatching of physical micro-ops by the reservation and dispatch circuit 38 and the differing number of processor 22 cycles required for execution of the differing types of physical micro-ops.

For one embodiment, the execution circuit 40 comprises a set of five execution units EU0–EU4. The reservation and dispatch circuit 38 dispatches up to five physical micro-ops concurrently to the execution units EU0–EU4 over the micro-op dispatch bus 60.

The execution unit EU0 performs arithmetic logic unit (ALU) functions including integer multiply and divide as well as floating-point add, subtract, multiply and divide micro-ops. The execution unit EU1 performs ALU integer functions and jump operations. The execution unit EU2 performs integer and floating-point load operations from memory as well as segmentation register operations and load linear address functions. The execution unit EU3 performs integer and floating-point store address operations. The execution unit EU4 performs integer and floating-point store data operations.

The reorder circuit 42 contains the physical registers that buffer speculative results for the physical micro-ops. Each physical register in the reorder circuit 42 accommodates either an integer data value or a floating-point data value.

The real register circuit 44 contains committed state registers that correspond to the architectural registers of the original stream of macroinstructions. For one embodiment, the committed state registers of the real register circuit 44 comprise the EAX, EBX, ECX, and EDX registers, etc. and floating-point registers of the Intel Architecture Microprocessor, as well as architectural flags for the Intel Architecture Microprocessor. The real register circuit 44 also contains committed state registers for the micro-code registers used by micro-code executing in the instruction fetch and micro-op issue circuit 32.

The reorder circuit 42 and the real register circuit 44 receive the physical micro-ops over the physical micro-op bus 52. The physical sources of the physical micro-ops specify physical registers in the reorder circuit 42 and committed state registers in the real register circuit 44 that hold the source data for the physical micro-ops.

The reorder circuit 42 and the real register circuit 44 read the source data specified by the physical sources, and transfer the source data to the reservation and dispatch circuit 38 over a source data bus 58. Each physical source of the physical micro-ops includes a real register file valid (rrfv) flag that indicates whether the source data is contained in a physical register in the reorder circuit 42 or a committed state register in the real register circuit 44.

The reorder circuit 42 and the real register circuit 44 share the source data bus 58 as a read path for the physical registers and the committed state registers. The read path sharing between reorder circuit 42 and the real register circuit 44 reduces the integrated circuit die area required to implement the processor 22 in comparison to an implementation having separate read paths.

The physical destinations of the physical micro-ops on the physical micro-op bus 52 specify physical registers in the reorder circuit 42 for buffering the speculative results of the out of order execution of the physical micro-ops. The reorder circuit 42 receives the physical destinations of the physical micro-ops over the physical micro-op bus 52, and clears the physical registers specified by the physical destinations.

The reorder circuit 42 receives the logical destinations corresponding to the physical micro-ops over the logical destination bus 54, and stores the logical destinations into the physical registers specified by the physical destinations of the physical micro-ops. The logical destinations in the physical registers of the reorder circuit 42 specify committed state registers in the real register circuit 44 for retirement of the corresponding physical micro-ops.

A retire logic circuit 46 reimposes order on the physical micro-ops by committing the speculative results held in the physical registers of the reorder circuit 42 to an architectural state in the same order as the original logical micro-ops were received. The retire logic circuit 46 reads speculative result data from the retiring physical registers of the reorder circuit 42, and transfers the speculative result data to corresponding committed state registers in the real register circuit 44 over a retirement bus 64. For one embodiment, the retire logic circuit 46 retires up to four physical registers concurrently.

The retire logic circuit 46 maintains a retirement pointer to the physical registers in the reorder circuit 42. The retirement pointer points to the next four consecutive physical registers for retirement. The retirement pointer follows the allocation pointer through the physical registers in the reorder circuit 42 as the retire logic 46 retires the speculative results of the physical registers to the architectural state. The retire logic circuit 46 retires the physical registers in order because the physical registers were allocated to the original logical micro-ops in order.

The retire logic circuit 46 retires a physical register by initially testing a corresponding valid bit of the physical register. If the valid bit indicates that the speculative result data for the corresponding physical micro-op is contained in the physical register, then the retire logic circuit 46 transfers the corresponding speculative result data to the committed state register in the real register circuit 44 specified by the logical destination contained in the physical register.

Figure 3:
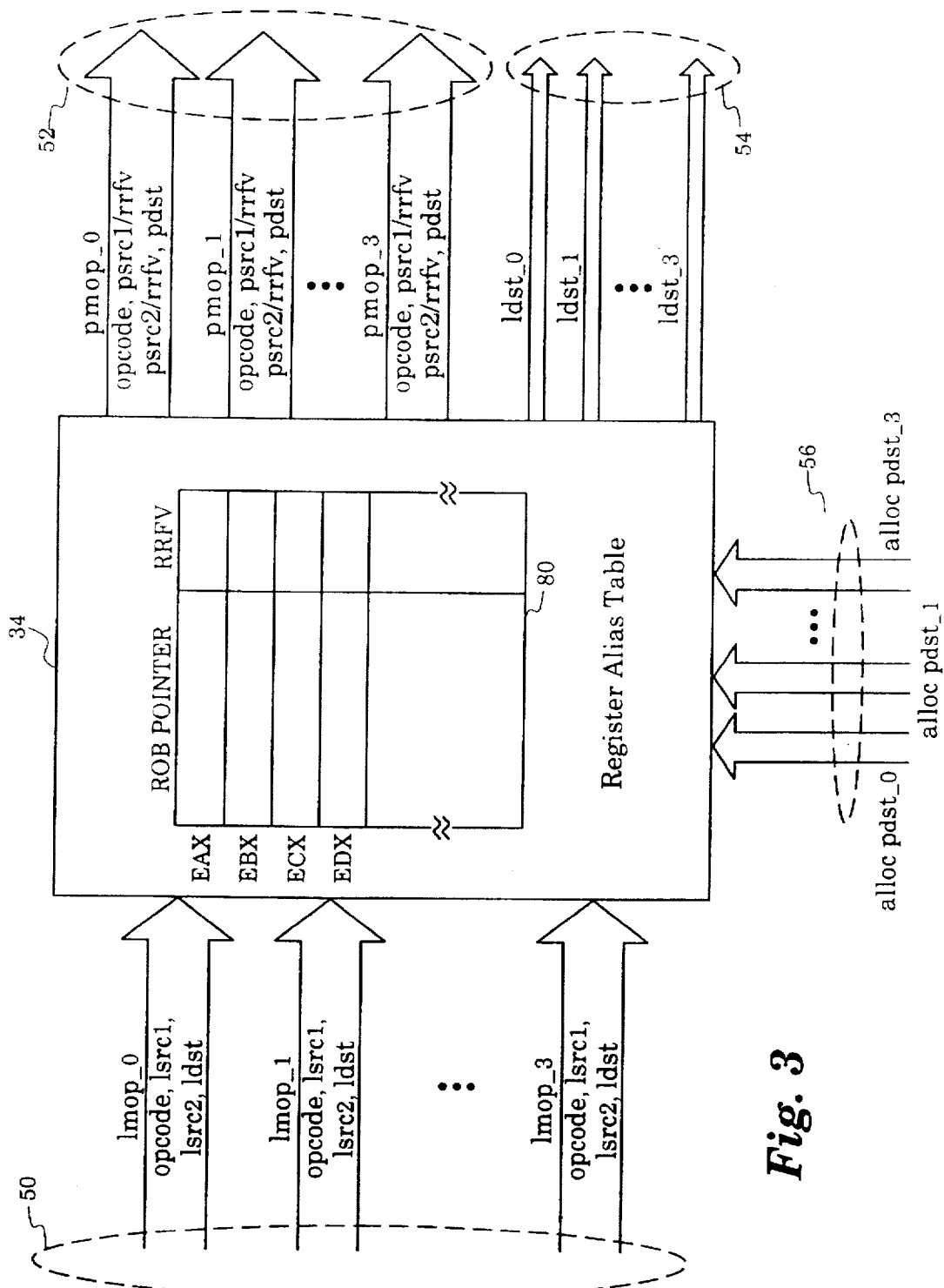
FIG. 3 illustrates the functions of the register alias circuit which converts logical micro-ops into physical micro-ops by renaming the logical sources and destinations of the logical micro-ops.

FIG. 3 is a diagram that illustrates the functions of the register alias circuit 34. The register alias circuit 34 receives logical micro-ops in order over the logical micro-op bus 50, converts the logical micro-ops into corresponding physical micro-ops by mapping the logical sources into physical sources, and then transfers the physical micro-ops in order over the physical micro-op bus 52.

The register alias circuit 34 implements a register alias table 80. The register alias table 80 performs logical to physical register renaming by mapping the logical sources of the logical micro-ops to the physical sources of the corresponding physical micro-ops. The physical sources and destinations of the physical micro-ops specify physical registers in the reorder circuit 42 and committed state registers in the real register circuit 44.

The entries in the register alias table 80 correspond to the architectural registers of the original macroinstruction stream. For one embodiment, the EAX, EBX, ECX, and EDX entries of the register alias table 80 correspond to the EAX, EBX, ECX, and EDX registers of the Intel Architecture Microprocessor.

Each entry in the register alias table 80 contains a reorder buffer (ROB) pointer. The ROB pointer specifies a physical register in the reorder circuit 42 that holds the speculative result data for the corresponding architectural register. Each entry in the register alias table 80 also contains a real register file valid (RRFV) flag that indicates whether the speculative result data for the corresponding architectural register has been retired to the appropriate committed state register in the real register circuit 44.

The register alias circuit 34 receives a set of in order logical micro-ops (lmop_0 through lmop_3) over the logical micro-op bus 50. Each logical micro-op comprises an op code, a pair of logical sources lsrc1 and lsrc2 and a logical destination ldst. The logical sources lsrc1 and lsrc2 and the logical destination ldst each specify an architectural register of the original stream of macro-instructions.

The register alias circuit 34 also receives a set of allocated physical destinations (alloc_pdst_0 through alloc_pdst_3) from the allocator circuit 36 over the physical destination bus 56. The physical destinations alloc_pdst_0 through alloc_pdst_3 specify newly allocated physical registers in the reorder circuit 42 for the logical micro-ops lmop_0 through lmop_3. The physical registers in the reorder circuit 42 specified by the physical destinations alloc_pdst_0 through alloc_pdst_3 will hold speculative result data for the physical micro-ops corresponding to the logical micro-ops lmop_0 through lmop_3.

The register alias circuit 34 transfers a set of in order physical micro-ops (pmop_0 through pmop_3) over the physical micro-op bus 52. Each physical micro-op comprises an op code, a pair of physical sources psrc1 and psrc2 and a physical destination pdst. The physical sources psrc1 and psrc2 each specify a physical register in the reorder circuit 42 or a committed state register in the real register circuit 44. The physical destination pdst specifies a physical register in the reorder circuit 42 to hold speculative result data for the corresponding physical micro-op.

The register alias circuit 34 generates the physical micro-ops pmop_0 through pmop_3 by mapping the logical sources of the logical micro-ops lmop_0 through lmop_3 to the physical registers of the reorder circuit 42 and the committed state registers specified of the real register circuit 44 as specified by the register alias table 80. The register alias circuit 34 merges the physical destinations alloc_pdst_0 through alloc_pdst_3 into the physical micro-ops pmop_0 through pmop_3.

The opcodes of the physical micro-ops pmop_0 through pmop_3 are the same as the corresponding opcodes of the logical micro-ops lmop_0 through lmop_3. For example, the register alias circuit 34 generates pmop_0 such that the op code of pmop_0 equals the opcode of lmop_0.

The register alias circuit 34 generates the physical source psrc1 for the physical micro-op pmop_0 by reading the register alias table 80 entry specified by the logical source lsrc1 of the lmop_0. If the RRFV flag of the specified register alias table 80 entry is not set, then the register alias circuit 34 transfers the ROB pointer from the specified register alias table 80 entry along with the RRFV flag over the physical micro-op bus 52 as the physical source psrc1 for the pmop_0. If the RRFV bit is set, then the register alias circuit 34 transfers a pointer to the committed state register in the real register circuit 44 that corresponds to the logical source lsrc1 along with the RRFV flag over the physical micro-op bus 52 as the physical source psrc1 for the pmop_0.

The register alias circuit 34 generates the physical source psrc2 for the physical micro-op pmop_0 by reading the register alias table 80 entry that corresponds to the logical source lsrc2 of the lmop_0. If the RRFV flag is not set, then the register alias circuit 34 transfers the ROB pointer from the specified register alias table 80 entry along with the RRFV flag over the physical micro-op bus 52 as the physical source psrc2 for the pmop_0. If the RRFV bit is set, then the register alias circuit 34 transfers a pointer to the committed state register in the real register circuit 44 that corresponds to the logical source lsrc2 along with the RRFV flag over the physical micro-op bus 52 as the physical source psrc2 for the pmop_0.

The register alias circuit 34 stores the physical destination alloc_pdst_0 into the ROB pointer field of the register alias table 80 entry specified by the logical destination ldst of the lmop_0, and clears the corresponding RRFV flag. The clear RRFV flag indicates that the current state of the corresponding architectural register is speculatively held in the physical register of the reorder circuit 42 specified by the corresponding ROB pointer.

The register alias circuit 34 transfers a set of logical destinations ldst_0 through ldst_3 over the logical destination bus 54. The logical destinations ldst_0 through ldst_3 are the logical destinations ldst of the logical micro-ops lmop_0 through lmop_3. The logical destination ldst_0 is the logical destination ldst of the lmop_0, the logical destination ldst_1 is the logical destination ldst of the lmop_1, etc. The logical destinations ldst_0 through ldst_3 identify the architectural registers that correspond to the physical destinations pdst for the physical micro-ops pmop_0 through pmop_3.

Figure 4:
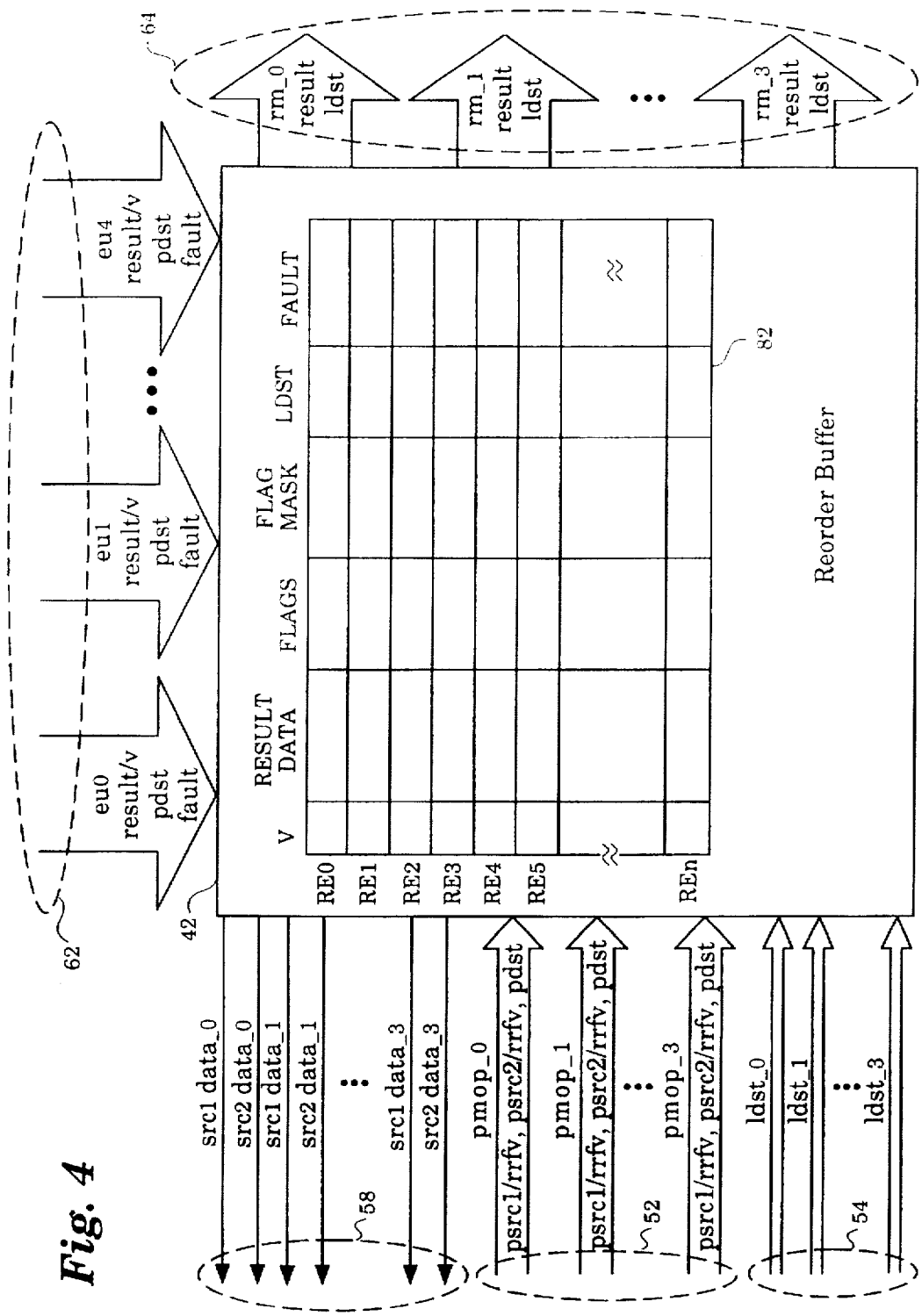
FIG. 4 illustrates the reorder circuit which contains a reorder buffer comprising a set of ROB entries (RE0 through REn) that buffer speculative result data from the out of order speculative execution of physical micro-ops.

FIG. 4 illustrates the reorder circuit 42. The reorder circuit 42 implements a reorder buffer 82 comprising a set of ROB entries (RE0 through REn). The ROB entries RE0 through REn are physical registers that buffer speculative result data from the out of order execution of physical micro-ops. For one embodiment, the ROB entries RE0 through REn comprise a set of 40 physical registers.

Each ROB entry comprises a valid flag (V), a result data value, a set of flags, a flag mask, a logical destination (LDST), and fault data.

The valid flag indicates whether the result data value for the corresponding ROB entry is valid. The reorder circuit 42 clears the valid flag for each newly allocated ROB entry to indicate an invalid result data value. The reorder circuit 42 sets the valid flag when speculative result data is written back to the ROB entry from the execution circuit 40.

The result data value is a speculative result from the out of order execution of the corresponding physical micro-op. The result data value may be either an integer data value or a floating-point data value. For one embodiment, the result data value field of each ROB entry RE0 through REn comprises 86 bits to accommodate both integer and floating-point data values.

The flags and flag mask provide speculative architectural flag information. The speculative architectural flag information is transferred to the architectural flags of the real register circuit 44 upon retirement of the corresponding ROB entry.

The logical destination LDST specifies a committed state register in the real register circuit 44. The result data value of the corresponding ROB entry is transferred to the committed state register specified by LDST during retirement of the ROB entry.

The fault data contains fault information for the fault handing micro-code executing in the instruction fetch and micro-op issue circuit 32. When a fault occurs, the fault processing micro-code reads the fault data to determine the cause of the fault.

The reorder circuit 42 receives the physical micro-ops pmop_0 through pmop_3 over the physical micro-op bus 52. The reorder circuit 42 reads the source data specified by the physical sources psrc1 and psrc2 of the physical micro-ops pmop_0 through pmop_3 from the reorder buffer 82. The reorder circuit 42 transfers the specified source data values and the valid flags to the reservation and dispatch circuit 38 over the source data bus 58.

For example, the result data values and valid flags from the ROB entries specified by the physical sources psrc1 and psrc2 of the pmop_0 are transferred as source data src1 data_0 and src2 data_0 over the source data bus 58. The source data src1 data_0 and src2 data_0 provides the source data specified by the physical sources psrc1 and psrc2 of the pmop_0 if the corresponding valid flags indicate valid source data. The src1 data_0 and the src2 data_0 may be separately driven by the reorder circuit 42 and the real register circuit 44.

Similarly, the reorder circuit 42 transfers the result data values and valid flags from the appropriate ROB entries as the source data src1 data_1 and src2 data_1 through source data src1 data_3 and src2 data_3 over the source data bus 58 for the physical micro-ops pmop_1 through pmop_3.

The reorder circuit 42 clears the valid bits of the ROB entries specified by the physical destinations pdst the physical micro-ops pmop_0 through pmop_3 received over the physical micro-op bus 52. The reorder circuit 42 clears the valid bits to indicate that the corresponding result data value is not valid because the physical micro-ops pmop_0 through pmop_3 that generate the result data value are being assembled in the reservation and dispatch circuit 38.

The reorder circuit 42 receives the logical destinations ldst_0 through ldst_3 over the logical destination bus 54. The reorder circuit 42 stores the logical destinations ldst_0 through ldst_3 into the LDST fields of the ROB entries specified by the physical destinations pdst the physical micro-ops pmop_0 through pmop_3.

For example, the reorder circuit 42 stores the ldst_0 into the LDST field of the ROB entry specified by the physical destination pdst of the pmop_0. The logical destination of the LDST field of a ROB entry specifies a committed state register in the real register circuit 44 for retirement of the corresponding ROB entry.

The reorder circuit 42 receives write back speculative result information from the execution circuit 40 over the result bus 62. The write back speculative result information from each execution unit EU0 through EU4 comprises a result data value, a physical destination pdst and fault data.

The reorder circuit 42 stores the write back speculative result information from the execution units EU0 through EU4 into the ROB entries specified by the physical destinations pdst on the result bus 62. For each execution unit EU0 through EU4, the reorder circuit 42 stores the result data value into the result data value field, and stores the fault data into the fault data field of the ROB entry specified by the physical destination pdst.

The result data values from the executions circuit 40 each include a valid flag. Each valid flag is stored in the valid flag field of the ROB entry specified by the physical destination pdst. The execution units EU0 through EU4 set the valid flags to indicate whether the corresponding result data values are valid.

The retire logic circuit 46 causes the reorder circuit 42 to commit the speculative result data values in the ROB entries RE0 through REn to architectural state by transferring the speculative result data values to the real register circuit 44 over the retirement bus 64.

The retirement bus 64 carries the speculative results for a set of retirement micro-ops rm_0 through rm_3. Each retirement micro-op rm_0 through rm_3 comprises a result data value and a logical destination ldst from one of the ROB entries RE0 through REn.

For one embodiment, the reorder circuit 42 receives up to four physical micro-ops over the physical micro-op bus 52 and receives write back result data for up to five dispatched physical micro-ops over the result bus 62 and receives read-modify-write requests for up to four retirement micro-ops over the retirement bus 58. The reorder circuit 42 implements eight read ports for reading the source data values from the reorder buffer 82 as required by the four physical micro-ops. The reorder circuit 42 also implements five write ports for the result data write back, and four read-modify-write ports for the retirement.

Figure 5:
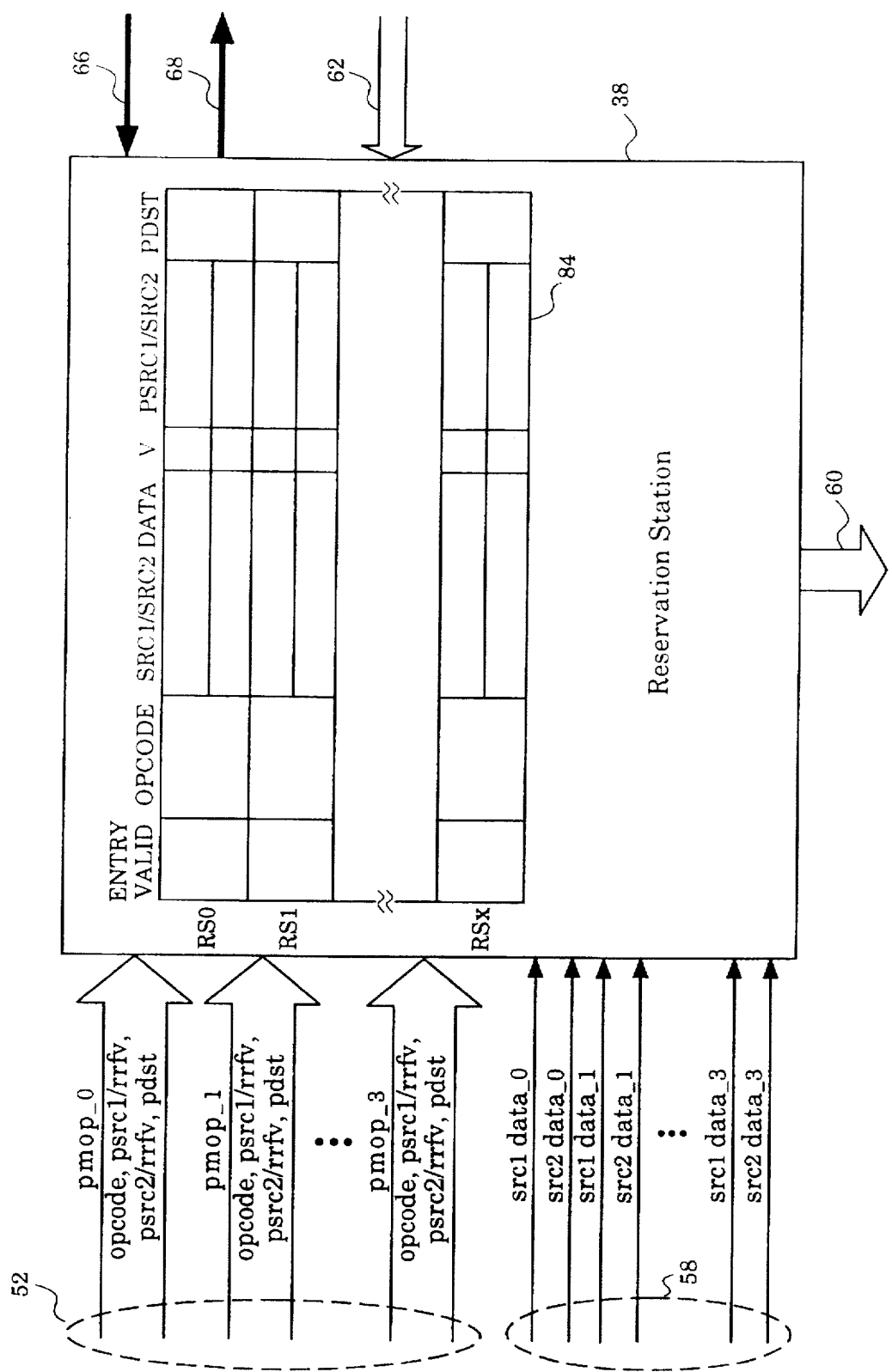
FIG. 5 illustrates the reservation and dispatch circuit which contains a reservation dispatch table comprising a set of reservation station entries RS0 through RSx for assembling and dispatching micro-ops.

FIG. 5 illustrates the reservation and dispatch circuit 38. The reservation and dispatch circuit 38 implements a reservation dispatch table 84 comprising a set of reservation station entries RS0 through RSx. The reservation and dispatch circuit 38 receives and stores the physical micro-ops pmop_0 through pmop_3 into available reservation station entries RS0 through RSx, assembles the source data for the physical micro-ops into the reservation station entries RS0 through RSx, and dispatches the ready physical micro-ops to the execution circuit 40. A physical micro-op is ready when the source data is fully assembled in a reservation station entry RS0 through RSx.

Each reservation station entry RS0 through RSx comprises an entry valid flag, an op code, a pair of source data values (SRC1/SRC2 DATA) and corresponding valid flags (V), a pair of physical sources (PSRC1/PSRC2), and a physical destination (PDST).

The entry valid flag indicates whether the corresponding reservation station entry RS0 through RSx holds a physical micro-op awaiting dispatch.

The op code specifies an operation of the execution unit circuit 40 for the physical micro-op in the corresponding reservation station entry RS0 through RSx.

The SRC1/SRC2 DATA fields of the reservation station entries RS0 through RSx hold the source data values for the corresponding physical micro-ops. The corresponding valid flags indicate whether the source data values are valid.

The physical destination PDST of each reservation station entry RS0 through RSx specifies a physical destination in the reorder circuit 42 to hold the speculative results for the corresponding physical micro-op.

The physical sources PSRC1/PSRC2 of each reservation station entry RS0 through RSx specify the physical destinations in the reorder circuit 42 that hold the source data for the corresponding physical micro-op. The reservation and dispatch circuit 38 uses the physical sources PSRC1/PSRC2 to detect write back of pending source data from the execution circuit 40 to the reorder circuit 42.

The reservation and dispatch circuit 38 receives the physical micro-ops pmop_0 through pmop_3 over the physical micro-op bus 52. The reservation and dispatch circuit 38 also receives the reservation station entry select signals 66 from the allocator circuit 36. The reservation station entry select signals 66 specify the new reservation station entries.

The reservation and dispatch circuit 38 stores the opcode and physical sources psrc1 and psrc2 for each physical micro-op pmop_0 through pmop_3 into the new reservation station entries RS0 through RSx specified by the reservation station entry select signals 66. The reservation and dispatch circuit 38 sets the entry valid flag for each new reservation station entry.

The reservation and dispatch circuit 38 receives the source data values and corresponding valid flags specified by the physical sources psrc1 and psrc2 of the physical micro-ops pmop_0 through pmop_3 from the reorder circuit 42 and the real register circuit 44 over the source data bus 58. The reservation and dispatch circuit 38 transfers the source data values and valid flags into the SRC1/SRC2 DATA fields and valid flags of the new reservation station entries corresponding to the physical micro-ops pmop_0 through pmop_3.

If the entry valid flags indicate that one or both of the source data values for a reservation station table entry RS0 through RSx is invalid, then the reservation and dispatch circuit 38 waits for the execution circuit 40 to execute previously issued physical micro-ops and generate the required source data values.

The reservation and dispatch circuit 38 monitors the physical destinations pdst on the result bus 62 as the execution circuit 40 writes back result data values to the reorder circuit 42. If a physical destination pdst on the result bus 62 corresponds to the physical destination of pending source data for a reservation station table entry RS0 through RSx, then the reservation and dispatch circuit 38 receives the result data value over the result bus 62 and stores the result data value into the corresponding SRC1/SRC2 DATA fields and valid flags. The reservation and dispatch circuit 38 dispatches the pending physical micro-ops to the execution circuit 40 if both source data values are valid.

Figure 6:
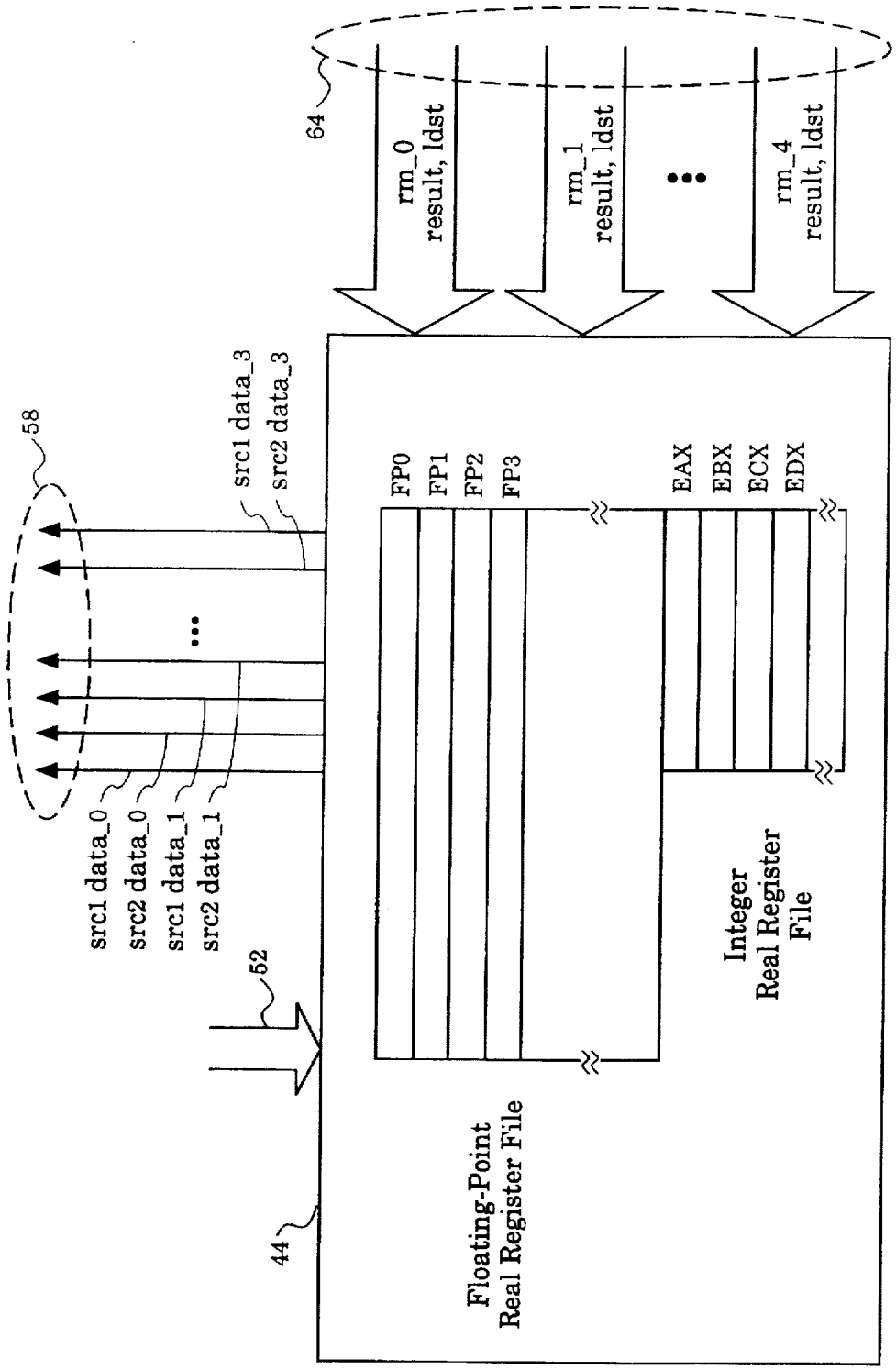
FIG. 6 illustrates the real register circuit which contains a real register file comprising a set of committed state registers that hold committed result data values for the architectural registers.

FIG. 6 illustrates the real register circuit 44. The real register circuit 44 implements a real register file 86. The real register file 86 comprises a set of committed state registers that hold committed result data values. The committed state registers buffer committed results for the architectural registers of the original stream of macro-instructions fetched by the instruction fetch and micro-op issue circuit 32.

For one embodiment, the committed state registers comprise the EAX, EBX, ECX, and EDX committed state registers, etc., and the FP0–FP7 floating-point registers that correspond to the architectural registers of the Intel Architecture Microprocessor. The real register file 86 also comprises committed state flags for the Intel Architecture Microprocessor, as well as micro-code registers used by micro-code executing in the instruction fetch and micro-op issue circuit 32.

The real register circuit 44 receives the physical micro-ops pmop_0 through pmop_3 over the physical micro-op bus 52. The real register circuit 44 reads the result data values from the committed state registers specified by the physical sources psrc1 and psrc2 of the physical micro-ops pmop_0 through pmop_3 from the real register file 86 if the RRFV flags indicate that the physical sources are retired.

The real register circuit 44 transfers the result data values from the committed state registers specified by the physical sources psrc1 and psrc2 of the physical micro-ops to the reservation and dispatch circuit 38 over the source data bus 58 if the RRFV flags indicate that the physical sources are retired in the real register file 86. The real register circuit 44 always sets the source data valid flags while transferring source data to the reservation and dispatch circuit 38 over the source data bus 58 because the result data in the committed state registers is always valid.

For example, the result data value from the committed state register specified by the physical source psrc1 of the pmop_0 is transferred as source data src1 data_0 over the source data bus 58 if the RRFV flag for the physical source psrc1 of the pmop_0 is set. The result data value from the committed state register specified by the physical source psrc2 of the pmop_0 is transferred as source data src2 data_0 over the source data bus 58 if the RRFV flag for the physical source psrc2 of the pmop_0 is set.

Similarly, the real register circuit 44 transfers source data src1/src2 data_1 through source data src1/src2 data_3 over the source data bus 58 to provide source data for the physical micro-ops pmop_1 through pmop_3 if the appropriate RRFV flags of the physical micro-ops pmop_1 through pmop_3 are set.

The real register circuit 44 receives the retirement micro-ops rm_0 through rm_3 from the reorder circuit 42 over the retirement bus 64. Each retirement micro-op rm_0 through rm_3 contains speculative results from one of the ROB entries RE0 through REn in the reorder buffer 82. The retirement micro-ops rm_0 through rm_3 correspond to sequential ROB entries.

Each retirement micro-op rm_0 through rm_3 comprises a result data value and a logical destination ldst. The real register circuit 44 stores the result data values of the retirement micro-ops rm_0 through rm_3 into the committed state registers of the real register file 86 specified by the logical destinations ldst the retirement micro-op rm_0 through rm_3.

The retire logic circuit 46 notifies the register alias circuit 34 and the allocator circuit 36 of micro-op retirement over a retire notification bus 70. The register alias circuit 34 updates the RRFV flags in the register alias table 80 to reflect the retirement. The allocator circuit 36 also receives the notice of retirement over the retire notification bus 70. The retirement notification indicates to the allocator circuit 36 that the retired physical registers in the reorder circuit 42 are available for allocation.

Figure 7:
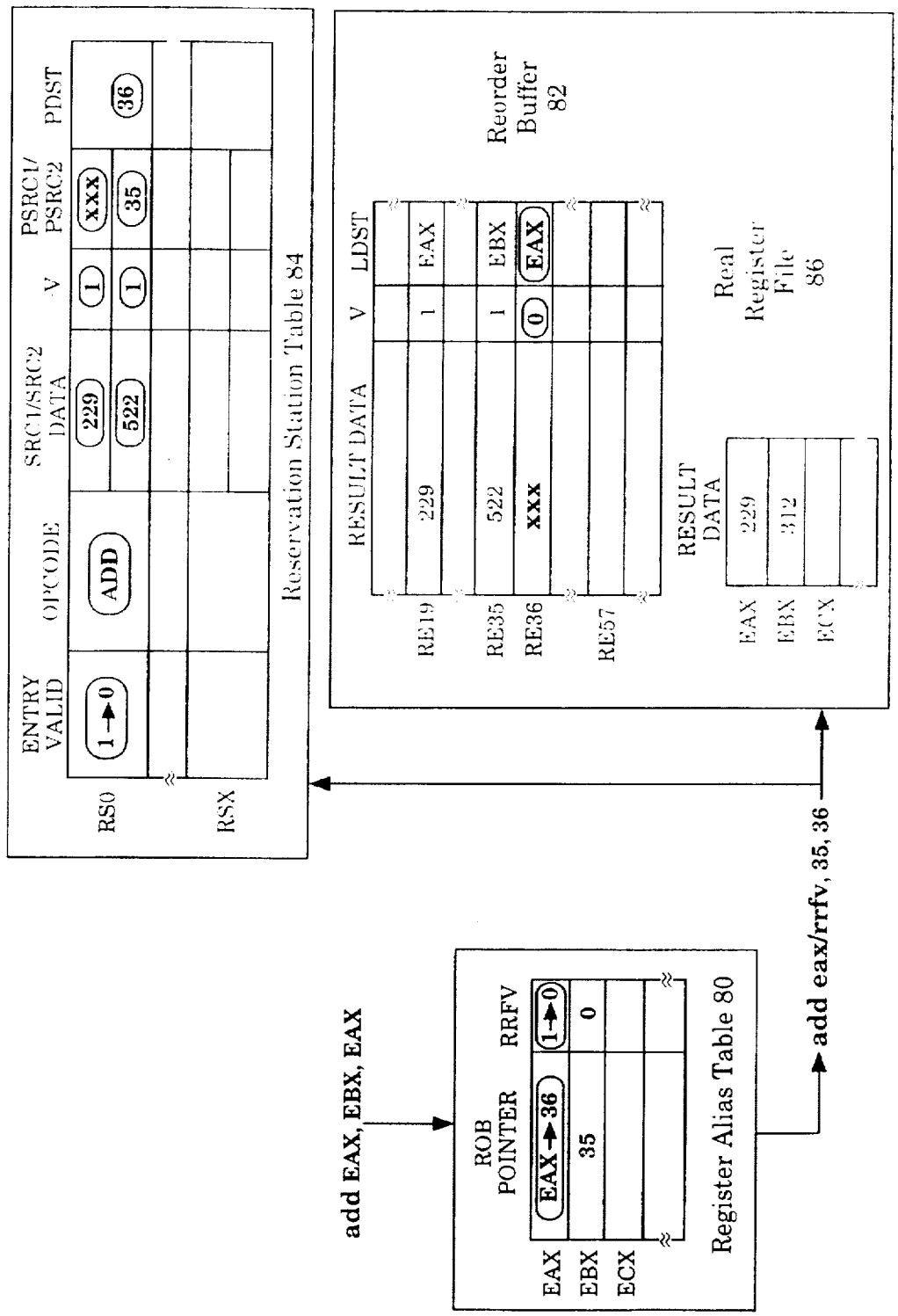
FIG. 7 illustrates a logical micro-op issue by the instruction fetch and micro-op issue circuit, wherein the logical micro-op comprises add EAX, EBX, EAX.

FIG. 7 illustrates a logical micro-op issued by the instruction fetch and micro-op issue circuit 32. The logical micro-op (add EAX, EBX, EAX) is transferred by the instruction fetch and micro-op issue circuit 32 over the logical micro-op bus 50.

The allocator circuit 36 receives the logical micro-op add EAX, EBX, EAX over the logical micro-op bus 50, and generates a physical destination pdst equal to 36. The allocator circuit 36 transfers the pdst 36 to the register alias circuit 34 over the physical destination bus 56.

The register alias circuit 34 receives the physical destination pdst 36, and translates the logical micro-op add EAX, EBX, EAX into a physical micro-op add eax/rrfv, 35, 36. The argument eax/rrfv specifies that psrc1 is the EAX entry in the real register file 86 because the RRFV flag for the EAX entry in the register alias table 80 is set. The argument 35 specifies that psrc2 is the RE35 entry in the reorder buffer 82 according to the ROB pointer and the RRFV flag for the EBX entry in the register alias table 80.

The register alias circuit 34 transfers the physical micro-op add eax/rrfv, 35, 36 to the reservation and dispatch circuit 38, the reorder circuit 42, and the real register circuit 44 over the physical micro-op bus 52.

The register alias circuit 34 stores the allocated pdst 36 for the physical micro-op add eax/rrfv, 35, 36 into the ROB pointer of the EAX entry in the register alias table 80. The register alias circuit 34 also clears the RRFV bit for the EAX entry in the register alias table 80 to indicate that the logical register EAX is mapped to the reorder buffer 82 in a speculative state.

The reorder circuit 42 and the real register circuit 44 receive the physical micro-op add eax/rrfv, 35, 36 over the physical micro-op bus 52. The real register circuit 44 reads source data for the physical source psrc1 eax/rrfv by reading the EAX entry of the real register file 86. The reorder circuit 42 reads source data for the physical source psrc2 35 by reading ROB entry RE35 of the reorder buffer 82. The EAX entry of the real register file 86 contains a result data value equal to 229 for the committed state of the EAX architectural register. The ROB entry RE35 of the reorder buffer 82 contains a result data value equal to 522 and a valid bit set for the current speculative state of the EBX architectural register.

The reorder circuit 42 and the real register circuit 44 transfer the result data values 229 and 522 and corresponding valid bits to the reservation and dispatch circuit 38 over the source data bus 58 as a source data src1 data and src2 data.

The reorder circuit 42 receives the logical destination ldst EAX for the physical micro-op add eax/rrfv, 35, 36 over the logical destination bus 54. The reorder circuit 42 stores the logical destination ldst EAX into the LDST of the entry RE36 of the reorder buffer 82. The reorder circuit 42 clears the valid flag of the entry RE36 of the reorder buffer 82 to indicate that the corresponding result data is not valid.

The reservation and dispatch circuit 38 receives the physical micro-op add eax/rrfv, 35, 36 over the physical micro-op bus 52. The reservation and dispatch circuit 38 stores the opcode add into the opcode field of the entry RS0 of the reservation station table 84 as specified by the allocator circuit 36. The reservation and dispatch circuit 38 stores the physical destination pdst 36 into the PDST of the reservation station table 84 entry RS0. The reservation and dispatch circuit 38 stores the physical sources psrc1 xxx and psrc2 35 into the PSRC1/PSRC2 of the reservation station table 84 entry RS0. The reservation and dispatch circuit 38 also sets the entry valid flag of the reservation station table 84 entry RS0.

The reservation and dispatch circuit 38 receives the source data values src1 data (=229) and src2 data (=522) and corresponding valid flags over the source data bus 58. The reservation and dispatch circuit 38 stores the source data values and corresponding valid flags into the SRC1/SRC2 and V fields of the reservation station table 84 entry RS0.

Figure 8:
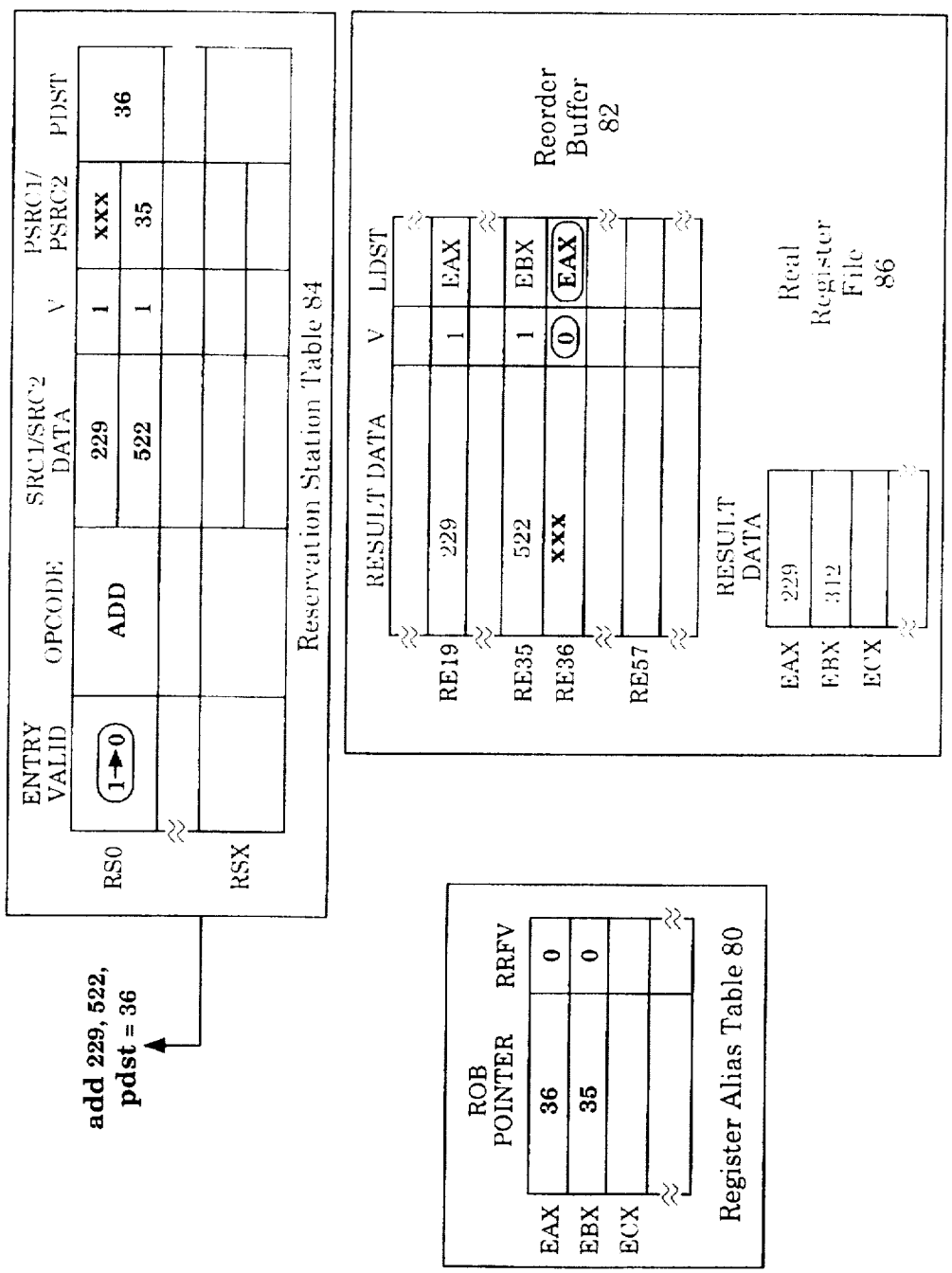
FIG. 8 illustrates a physical micro-op dispatch by the reservation and dispatch circuit, and shows a physical micro-op add eax/rrfv, 35, 42 assembled in the reservation station table entry RS0 ready for dispatch to the execution circuit.

FIG. 8 illustrates a physical micro-op dispatch by the reservation and dispatch circuit 38. The physical micro-op add eax/rrfv, 35, 36 in the reservation station table 84 entry RS0 is ready for dispatch to the execution circuit 40 because the source data is fully assembled.

The reservation and dispatch circuit 38 transfers a dispatched physical micro-op add 229, 522, pdst=36 to an appropriate execution unit in the execution circuit 40 over the micro-op dispatch bus 60. The reservation and dispatch circuit 38 generates dispatched physical micro-op add 229, 522, pdst=36 by reading the OP-CODE and the SRC1/SRC2 and the PDST fields of the reservation station table 84 entry RS0.

The reservation and dispatch circuit 38 then clears the entry valid flag of the reservation station table 84 entry RS0 to enable allocation of the entry RS0 to a subsequent physical micro-op. The reservation and dispatch circuit 38 notifies the allocator circuit 36 of the physical micro-op dispatch over an RS dispatch bus 68. Thereafter, the allocator circuit 36 allocates the reservation station table 84 entry RS0 to a subsequent physical micro-op.

Figure 9:
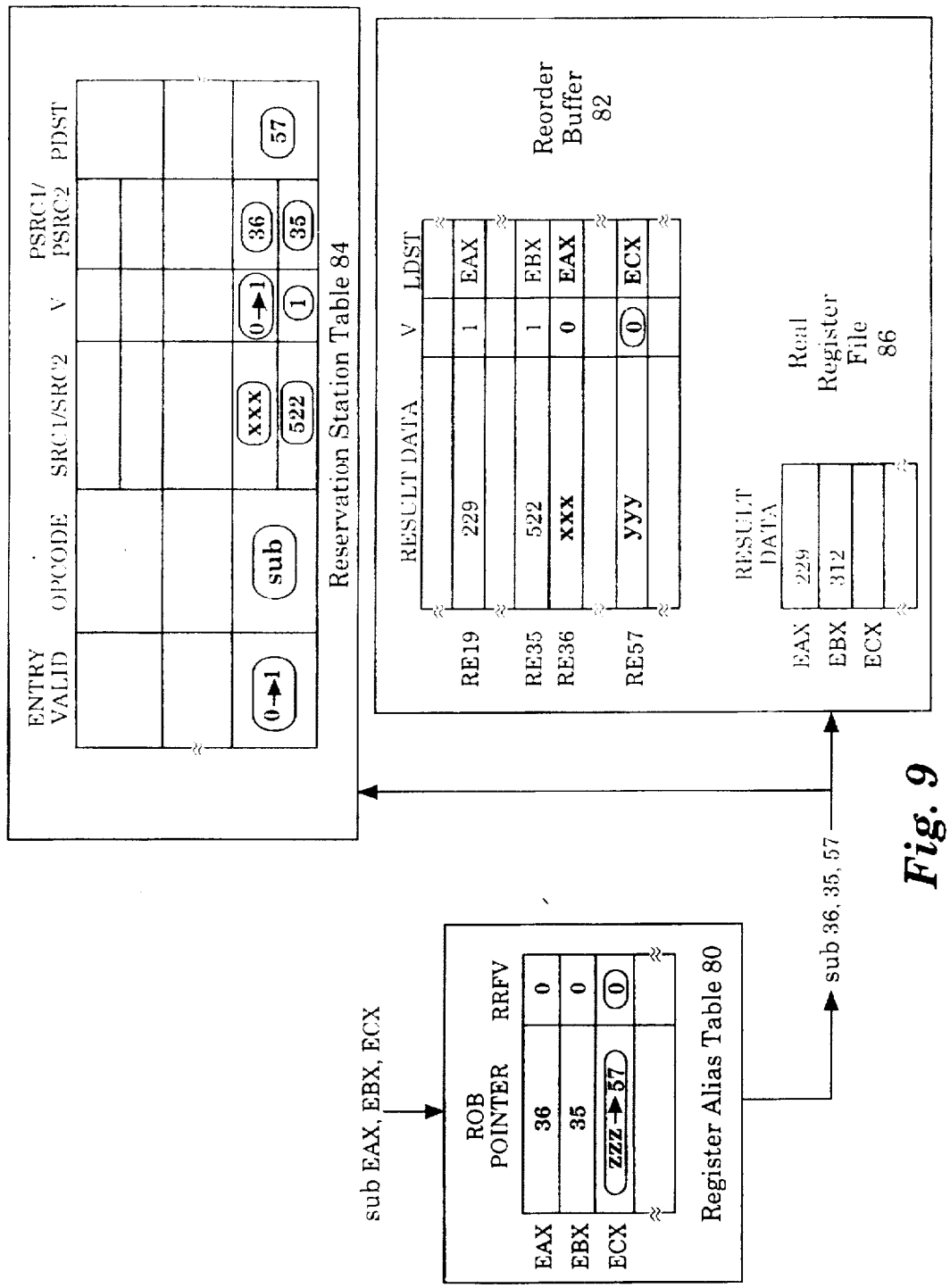
FIG. 9 illustrates the issue of a logical micro-op sub EAX, EBX, ECX by the instruction fetch and micro-op issue circuit.

FIG. 9 illustrates another logical micro-op issue by the instruction fetch and micro-op issue circuit 32. The instruction fetch and micro-op issue circuit 32 issues a logical micro-op (sub EAX, EBX, ECX) over the logical micro-op bus 50 while the execution circuit 40 executes the dispatched physical micro-op add 229, 522, pdst=36.

The allocator circuit 36 receives the logical micro-op sub EAX, EBX, ECX over the logical micro-op bus 50, and generates a physical destination pdst equal to 57. The allocator circuit 36 transfers the pdst 57 to the register alias circuit 34 over the physical destination bus 56.

The register alias circuit 34 receives the physical destination pdst 57, and translates the logical micro-op sub EAX, EBX, ECX into a physical micro-op sub 36, 35, 57. The argument 36 specifies that psrc1 is the RE36 entry in the reorder buffer 82 according to the ROB pointer and the RRFV flag for the EAX entry in the register alias table 80. The argument 35 specifies that psrc2 is the RE35 entry in the reorder buffer 82 according to the ROB pointer and the RRFV flag for the EBX entry in the register alias table 80.

The register alias circuit 34 transfers the physical micro-op sub 36, 35, 57 to the reservation and dispatch circuit 38, the reorder circuit 42, and the real register circuit 44 over the physical micro-op bus 52.

The register alias circuit 34 stores the allocated pdst 57 for the physical micro-op sub 36, 35, 57 into the ROB pointer of the ECX entry in the register alias table 80. The register alias circuit 34 also clears the RRFV bit for the ECX entry in the register alias table 80 to indicate that the logical register ECX is mapped to the reorder buffer 82 in a speculative state.

The reorder circuit 42 and the real register circuit 44 receive the physical micro-op sub 36, 35, 57 over the physical micro-op bus 52. The real register circuit 44 reads source data for the physical source psrc1 36 by reading ROB entry RE36 of the reorder buffer 82. The reorder circuit 42 reads source data for the physical source psrc2 35 by reading ROB entry RE35 of the reorder buffer 82.

The ROB entry RE36 of the reorder buffer 82 contains a result data value equal xxx and a valid bit clear to indicate invalid result data for the current speculative state of the EBX architectural register. The result data for RE36 is invalid before the execution circuit writes back results for the dispatched physical micro-op add 229, 522, pdst=36. The ROB entry RE35 of the reorder buffer 82 contains a result data value equal to 522 and a valid bit set for the current speculative state of the EBX architectural register.

The reorder circuit 42 and the real register circuit 44 transfer the result data values xxx and 522 and the corresponding valid bits to the reservation and dispatch circuit 38 over the source data bus 58 as a source data pair src1 data and src2 data.

The reorder circuit 42 receives the logical destination ldst ECX for the physical micro-op sub 36, 35, 57 over the logical destination bus 54. The reorder circuit 42 stores the logical destination ldst ECX into the LDST of the entry RE57 of the reorder buffer 82. The reorder circuit 42 clears the valid flag of the entry RE57 of the reorder buffer 82 to indicate that the corresponding result data is not valid.

The reservation and dispatch circuit 38 receives the physical micro-op sub 36, 35, 57 over the physical micro-op bus 52. The reservation and dispatch circuit 38 stores the opcode sub into the opcode field of the entry RSx of the reservation station table 84 as specified by the allocator circuit 36. The reservation and dispatch circuit 38 stores the physical destination pdst 57 into the PDST of the reservation station table 84 entry RSx. The reservation and dispatch circuit 38 stores the physical sources psrc1 36 and psrc2 35 into the PSRC1/PSRC2 of the reservation station table 84 entry RSx. The reservation and dispatch circuit 38 also sets the entry valid flag of the reservation station table 84 entry RSx.

The reservation and dispatch circuit 38 receives the source data values src1/src2 data xxx and 522 and corresponding valid flags over the source data bus 58. The reservation and dispatch circuit 38 stores the source data values and corresponding valid flags into the SRC1/SRC2 and V fields of the reservation station table 84 entry RSx.

The physical micro-op sub 36, 35, 57 in the reservation station table 84 entry RSx is not ready for dispatch to the execution circuit 40 because the source data is not fully assembled until result write back from the dispatched physical micro-op add 229, 522, pdst=36.

Figure 10:
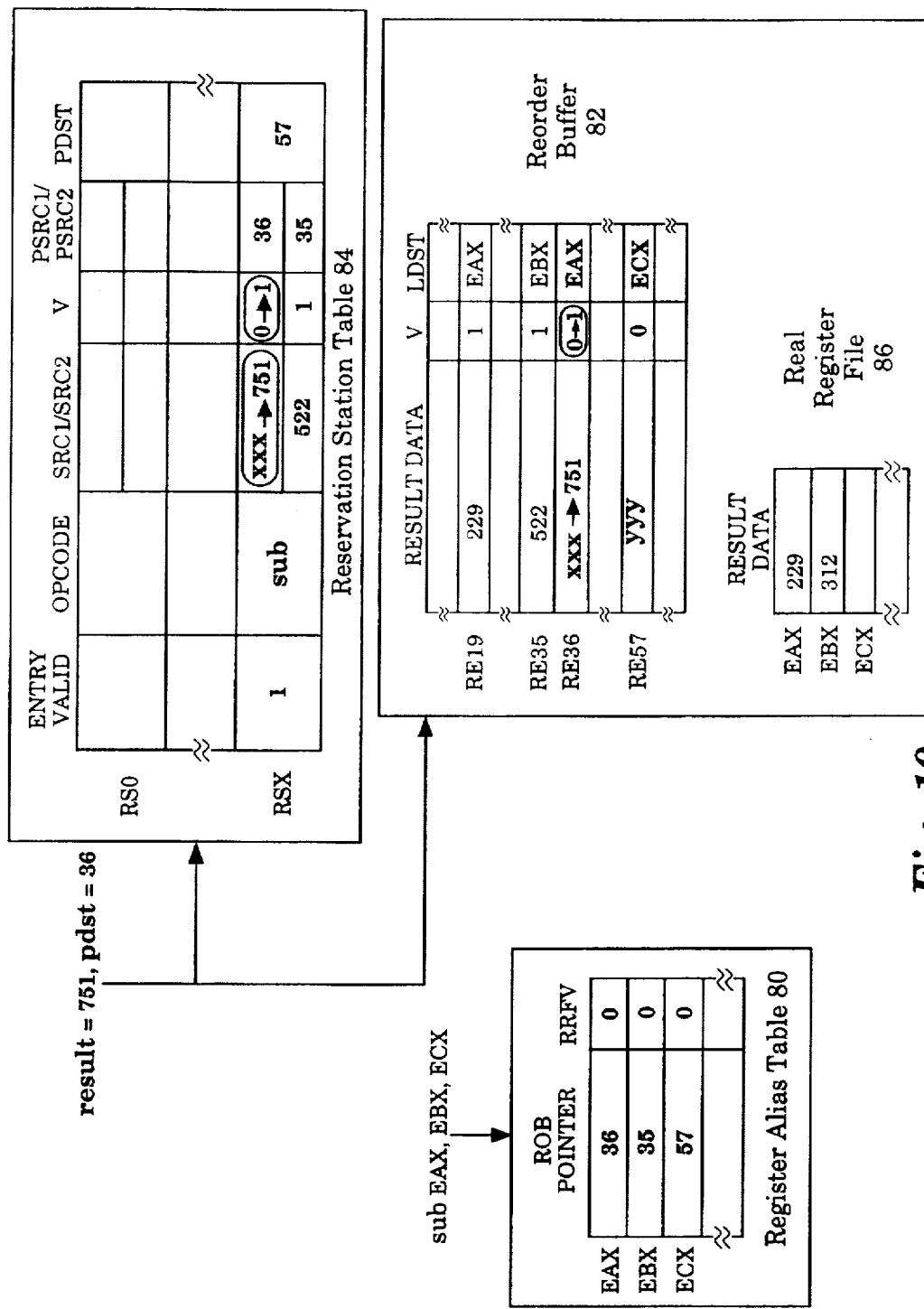
FIG. 10 illustrates a result data write back from the execution circuit to the reorder circuit for the dispatched physical micro-op add 229, 522, pdst=42.
Figure 12:
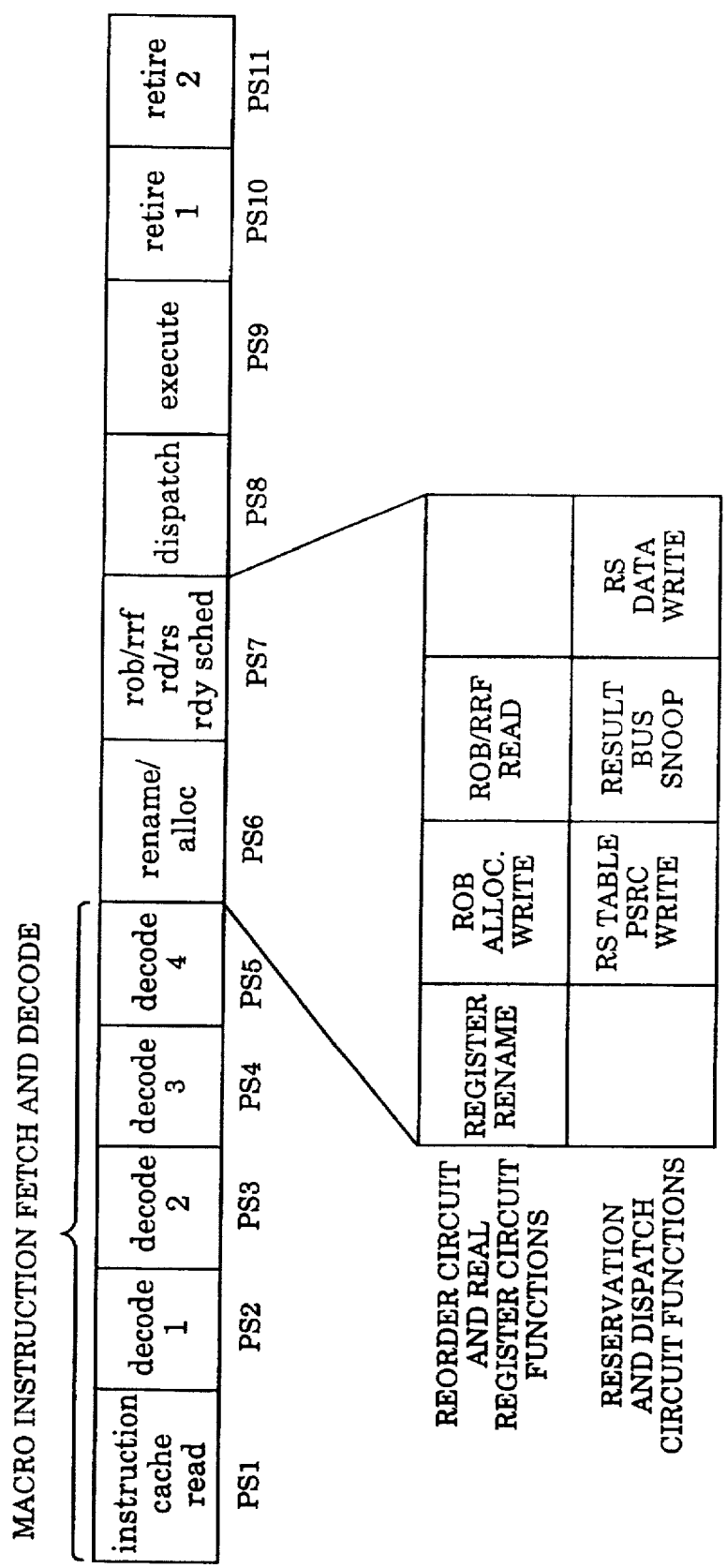
FIG. 12 illustrates the flow of micro-ops through a series of pipeline stages (PS1 through PS11) of the processor, and shows an expanded view of the functions performed by the reorder circuit, the real register circuit, and the reservation and dispatch circuit.

FIG. 10 illustrates a result data write back from the execution circuit 40 to the reorder circuit 42. The execution circuit 40 writes back the result=751 and corresponding physical destination pdst 36 for the dispatched physical micro-op add 229, 522, pdst=36 to the reservation and dispatch circuit 38 over the result bus 62.

The reservation and dispatch circuit 38 detects the result for the physical destination 36 on the result bus 62. The reservation and dispatch circuit 38 receives the result=751 and corresponding valid flag over the result bus 62, and stores the result=751 into the SRC1 data and the valid flag to the V field of the reservation station table 84 entry RSx. The physical micro-op sub 36, 35, 57 in the reservation station table 84 entry RSx is now ready for dispatch to the execution circuit 40 because the source data is fully assembled.

The reorder circuit 42 receives the result=751 and corresponding valid flag and physical destination pdst 36 over the result bus 62. The reorder circuit 42 stores the result=751 into the result data of the reorder buffer 82 entry RE36 as specified by the physical destination pdst 36. The reorder circuit 42 also sets the corresponding valid flag to indicate that the reorder buffer 82 entry RE36 contains valid speculative data for the EAX architectural register.

FIG. 11 illustrates the retirement of speculative information from physical registers in the reorder buffer 82 to committed state registers in the real register file 86 over the retirement bus 64. The retire logic circuit 46 retires the physical registers in the reorder buffer 82 in order as the retirement pointer follows the allocation pointer through the in order physical registers.

The retire logic circuit 46 retires the physical register RE35 by initially testing the corresponding valid bit. The valid bit indicates that the corresponding speculative result data is valid. As a consequence, the retire logic circuit 46 transfers speculative result data from the physical register RE35 to the committed state register EBX in the real register file 86 as specified by the LDST of the physical register RE35.

The retire logic circuit 46 then retires the physical register RE36 by initially testing the corresponding valid bit. The valid bit of the physical register RE36 indicates that the corresponding speculative result data is valid. The retire logic circuit 46 transfers speculative result data from the physical register RE36 to the committed state register EAX in the real register file 86 as specified by the LDST of the physical register RE36.

The retire logic circuit 46 notifies the register alias circuit 34 and the allocator circuit 36 of the physical register RE35 and RE36 retirement over the retire notification bus 70. The register alias circuit 34 updates the RRFV flags in the register alias table 80 to reflect the retirement. The retirement notification indicates to the allocator circuit 36 that the retired physical registers RE35 and RE36 are available for allocation.

For one embodiment, the retire logic circuit 46 commits the speculative result data in the reorder buffer 82 to architectural state by transferring the speculative result data to the real register file 86.

For another embodiment, physical registers that buffer speculative result data and committed result data are implemented in a unified speculative/committed register array. A speculative register alias table maps the speculative entries in the unified speculative/committed register array, and a committed register alias table maps the committed entries in the unified speculative/committed register array. The retire logic circuit 46 commits the speculative result data to architectural state by searching the unified speculative/committed register array for the next speculative entries to retire to the committed state.

FIG. 11 illustrates the flow of micro-ops through a series of pipeline stages (PS1 through PS11) of the processor 22. An expanded view is provided of the functions performed by the reorder circuit 42 and the real register circuit 44, and the reservation and dispatch circuit 38.

During pipeline stages PS1 through PS5, the instruction fetch and micro-op issue circuit 32 fetches a stream of macroinstructions from the memory subsystem 26 over the host bus 28 through the bus interface circuit 30. The instruction fetch and micro-op issue circuit 32 also converts the incoming in-order stream of macroinstructions into an in-order stream of logical micro operations, and transfers the in-order stream of logical micro-ops to the register alias circuit 34 and the allocator circuit 36 over the logical micro-op bus 50.

During pipeline stage PS6, the allocator circuit 36 assigns physical registers in the reorder circuit 42 to the incoming logical micro-ops on the logical micro-op bus 50, and assigns reservation station entries in the reservation and dispatch circuit 38 to the physical micro-ops on the physical micro-op bus 52. The register alias circuit 34 renames the logical registers of the in-order logical micro-ops on the logical micro-op bus 50 to generate the in-order physical micro-ops. The register alias transfers the in-order physical micro-ops over a physical micro-op bus 52.

During pipeline stage PS7, the reorder circuit 42 and the real register circuit 44 receive the physical micro-ops over the physical micro-op bus 52, read the source data specified by the physical sources, and transfer the source data to the reservation and dispatch circuit 38 over the source data bus 58. The reservation and dispatch circuit 38 receives the physical micro-ops over the physical micro-op bus 50 and stores the physical micro-ops in available reservation station entries. The reservation and dispatch circuit 38 assembles the source data for the physical micro-ops, and schedules the physical micro-ops having completely assembled source data for execution.

During pipeline stage PS8, the reservation and dispatch circuit 38 dispatches the ready physical micro-ops to the execution circuit 40 over the micro-op dispatch bus 60. The reservation and dispatch circuit 38 schedules execution of physical micro-ops out of order according to the availability of the source data required by the physical micro-ops.

During pipeline stage PS9, the execution circuit 40 executes the dispatched physical micro-ops from the reservation and dispatch circuit 38, and writes back results to the reorder circuit 42 over the result bus 62.

During pipeline stages PS10–PS11, the retire logic circuit 46 retires a set of physical micro-ops by committing the corresponding speculative results in the physical registers of the reorder circuit 42 to the architectural state. The retire logic circuit 46 reads the speculative result data from the physical registers of the reorder circuit 42, and transfers the speculative result data to corresponding committed state registers in the real register circuit 44 over the retirement bus 64. The retire logic circuit 46 retires the physical registers in order as the retirement pointer follows the allocation pointer in order through the reorder buffer 82.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A processor, comprising:

a source data bus;

a register alias circuit coupled to receive a logical instruction comprising an opcode, and a logical source specifying an architecturalitectural register, the register alias circuit being configured to generate a physical instruction from the logical instruction by replacing the logical source with a physical source specifying either a physical register or a committed state register;

reorder circuit coupled to receive the physical source from the register alias circuit, the reorder circuit including the physical register for buffering a speculative source data value and being configured to read the speculative source data value from the physical register and to transfer the speculative source data value over a source data bus if the physical source specifies the physical register;

a real register circuit coupled to receive the physical source from the register alias circuit, the real register circuit including the committed state register for buffering a committed source data value and being configured to read the committed source data value from the committed state register and to transfer the committed source data value over the source data bus if the physical source specifies the committed state registers; and a reservation and dispatch circuit coupled to receive a source data value, comprising either the speculative source data value or the committed source data value, transferred over the source data bus.

2. The processor of claim 1, wherein the physical source includes a real register valid flag that indicates whether the physical source specifies the physical register or the committed state register.

3. The processor of claim 1, wherein each physical register is configured to buffer either an integer data value or a floating point data value.

4. The processor of claim 1, wherein the register alias circuit comprises a register alias table that maps the architecturalitectural register specified by the logical source of the logical instruction to the physical register specified by the physical source.

5. The processor of claim 1, wherein the committed state register in the real register circuit corresponds to an architecturalitectural register.

6. The processor of claim 4, wherein the logical instruction further comprises a logical destination that specifies an architecturalitectural register such that the register alias circuit generates a physical destination for the physical instruction by mapping the architecturalitectural register specified by the logical destination to a physical register specified by the physical destination.

7. The processor of claim 6, wherein the reorder circuit clears the physical register specified by the physical destination of the physical instruction, and wherein the reorder circuit is coupled to receive the logical destination from the register alias circuit and is configured to store the logical destination into the physical register specified by the physical destination.

8. The processor of claim 7, wherein the reservation and dispatch circuit is coupled to receive the physical instruction from the register alias circuit, the reservation and dispatch circuit assembling a dispatch instruction for the physical instruction by assembling the opcode, the source data value and the physical destination for the physical instruction, the reservation and dispatch circuit transferring the dispatch instruction over a dispatch bus, and wherein the processor further comprises:

an execution circuit coupled to receive the dispatch instruction and configured to execute the dispatch instruction according to the opcode, the execution circuit generating a result data value for the dispatch instruction and transferring the result data value and the physical destination of the dispatch instruction over a result bus.

9. The processor of claim 8, wherein the reorder circuit receives the result data value and the physical destination over the result bus, the reorder circuit buffering the result data value as a speculative source data value in the physical register specified by the physical destination.

10. The processor of claim 9, further comprising a retire logic circuit reading the result data value and the logical destination from the physical register specified by the physical destination and writing the result data value into a committed state register in the real register circuit specified by the logical destination read from the physical register.

11. A method for accessing speculative and committed resources in a processor, comprising the steps of:

receiving a logical instruction comprising an opcode, and a logical source specifying an architecturalitectural register;

generating a physical instruction from the logical instruction by replacing the logical source with a physical source, the physical source specifying a physical register for buffering speculative execution results or a committed state register for buffering committed execution results;

reading a speculative source data value from the physical register if the physical source specifies the physical register;

reading a committed source data value from the committed state register if the physical source specifies the committed state register; and propagating a source data value, comprising either the speculative source data value or the committed source data value, to a reservation and dispatch register for inclusion into a dispatch instruction.

12. The method of claim 11, wherein the physical source includes a real register valid flag that indicates whether the physical source specifies the physical register or the committed state register.

13. The method of claim 11, wherein the physical register buffers an integer data value or a floating point data value.

14. The method of claim 11, wherein a register alias table maps the architecturalitectural register specified by the logical source of the logical instruction to the physical register specified by the physical source.

15. The method of claim 11, wherein the committed state register in the real register circuit corresponds to an architectural register.

16. The method of claim 14, wherein the logical instruction further comprises a logical destination that specifies an architecturalitectural register, and further comprising the step of generating a physical destination for the physical instruction by mapping the architecturalitectural register specified by the logical destination of the logical instruction to a physical register specified by the physical destination.

17. The method of claim 16, further comprising the steps of clearing the physical register specified by the physical destination of the physical instruction, and storing the logical destination into the physical register specified by the physical destination.

18. The method of claim 17, further comprising the steps of:

assembling the dispatch instruction for the physical instruction by assembling the opcode, the source data value and the physical destination for the physical instruction; and executing the dispatch instruction according to the opcode, thereby generating a result data value for the dispatch instruction.

19. The method of claim 18, further comprising the step of storing the result data value in the physical register specified by the physical destination.

20. The method of claim 19, further comprising the steps of reading the result data value and the logical destination from the physical register specified by the physical destination and writing the result data value into a committed state register specified by the logical destination lead from the physical register.

21. An apparatus for accessing speculative and committed resources in a processor, the apparatus comprising:

means for receiving a logical instruction comprising an opcode, and a logical source specifying an architecturalitectural register;

first buffer means comprising a plurality of physical registers that buffer speculative execution results;

second buffer means comprising a plurality of committed state registers that buffer committed execution results;

means for generating a physical instruction from the logical instruction by replacing the logical source with a physical source, the physical source specifying a physical register within the first buffer means or a committed state register within the second buffer means;

means for reading a speculative source data value from the physical register if the physical source specifies the physical register;

means for reading a committed source data value from the committed state register if the physical source specifies the committed state register; and means for assembling a dispatch instruction, the means for assembling being coupled to receive a source data value, comprising either the speculative or committed source value, and being configured to assemble the source data value into the dispatch instruction.

22. The apparatus of claim 21, wherein the physical source includes a real register valid flag that indicates whether the physical source specifies the physical register or the committed state register.

23. The apparatus of claim 21, wherein the physical register is configured to buffer either an integer data value or a floating point data value.

24. The apparatus of claim 21, wherein a register alias table maps the architecturalitectural register specified by the logical source to the physical register specified by physical source.

25. The apparatus of claim 24, wherein the logical instruction further comprises a logical destination that specifies an architecturalitectural register, the apparatus further comprising means for generating a physical destination for the physical instruction by mapping the architecturalitectural register specified by the logical destination to a physical register specified by the physical destination.

26. The apparatus of claim 24, wherein the committed state register in the real register circuit corresponds to an architecturalitectural register.

27. The apparatus of claim 25, further comprising means for clearing the physical register specified by the physical destination of the physical instruction, and means for storing the logical destination into the physical register specified by the physical destination.

28. The apparatus of claim 27, wherein the means for assembling the dispatch instruction assemble the opcode, the source data value and the physical destination for the physical instruction into the dispatch instruction, and wherein the apparatus further comprises:

means for executing the dispatch instruction according to the opcode, thereby generating a result data value for the dispatch instruction.

29. The apparatus of claim 28, further comprising means for storing the result data value in the physical register specified by the physical destination.

30. The apparatus of claim 29, further comprising means for reading the result data value and the logical destination from the physical register specified by the physical destination and means for writing the result data value into a committed state register specified by the logical destination read from the physical register.

31. A computer system, comprising:

source data bus;

a memory subsystem coupled for communication over a host bus, the memory subsystem storing a logical instruction comprising an opcode, and a logical source specifying an architecturalitectural register;

a first buffer comprising a plurality of physical registers that buffer speculative execution results;

a second buffer comprising a plurality of committed state registers that buffer committed execution results;

means for generating a physical instruction from the logical instruction by replacing the logical source with a physical source, the physical source specifying one of the physical registers or one of the committed state registers;

means for reading a speculative source data value from the physical registers, and for propagating the speculative source data value over the source data bus, if the physical source specifies one of the physical registers;

means for reading a committed source data value from the committed state registers, and for propagating the committed source data value over the source data bus, if the physical source specifies one of the committed state registers; and means for assembling a dispatch instruction, the means for assembling being coupled to receive a source data value, comprising either the speculative or committed source data value, propagated over the source data bus.

32. A computer system, comprising:

a memory subsystem coupled for communication over a host bus, the memory subsystem storing a logical instruction comprising an opcode, and a logical source, the logical source specifying one of a plurality of architecturalitectural registers; and a processor coupled to receive the logical instruction over the host bus, the processor generating a physical instruction by renaming the logical source as a physical source, the processor having a physical register for buffering speculative execution results and a committed state register for buffering committed execution results, the processor reading a speculative source data value from the physical register if the physical source specifies the physical register, the processor reading a committed source data value from the committed state register if the physical source specifies the committed state register, the processor further including a reservation and dispatch register coupled to receive a source data value, comprising either the speculative or committed source data value, for assembly into a dispatch instruction.

33. The computer system of claim 32, wherein the processor comprises:

a register alias circuit coupled to receive the logical instruction and configured to rename the logical source as the physical source;

a reorder circuit coupled to receive the physical instruction from the register alias circuit, the reorder circuit comprising the physical register, the reorder circuit reading the speculative source data value from the physical register and transferring the speculative source data value over a source data bus if the physical source specifies the physical register; and real register circuit coupled to receive the physical instruction from the register alias circuit, the real register circuit comprising the committed state register, the real register circuit reading the committed source data value from the committed state register and transferring the committed source data value over the source data bus if the physical source specifies the committed state register.

* * * * *

UNITED STATES PATENT AND TRADEMARK OFFICE
CERTIFICATE OF CORRECTION

| | | |
|---|---|---|
| PATENT NO. | : | 5,627,985 |
| DATED | : | May 6, 1997 |
| INVENTOR(S) | : | Fetterman et al. |

It is certified that error appears in the above-identified patent and that said Letters Patent is hereby corrected as shown below:

In column 21 at line 11 delete "lead" and insert --read--

Signed and Sealed this

Nineteenth Day of August, 1997

*Attest:*

BRUCE LEHMAN

*Attesting Officer*     *Commissioner of Patents and Trademarks*